United States Patent [19]
Thiessen

[11] 3,966,237
[45] June 29, 1976

[54] PIPE COUPLING FOR LARGE DIAMETER PIPE

[75] Inventor: Leo K. Thiessen, Shawnee Mission, Kans.

[73] Assignee: Aeroquip Corporation, Jackson, Mich.

[22] Filed: June 23, 1975

[21] Appl. No.: 589,056

Related U.S. Application Data

[63] Continuation of Ser. No. 452,877, March 20, 1974, abandoned.

[52] U.S. Cl. ............................. 285/112; 285/373; 285/423
[51] Int. Cl.² ...................................... F16L 17/04
[58] Field of Search .......... 285/112, 373, 367, 366, 285/365, 337, 423

[56] References Cited
UNITED STATES PATENTS

| | | | |
|---|---|---|---|
| 186,435 | 1/1877 | Parsons | 285/373 X |
| 1,165,388 | 12/1915 | Clark | 285/373 X |
| 2,998,269 | 8/1961 | Houghton | 285/112 X |
| 3,251,615 | 5/1966 | Short | 285/112 |
| 3,329,446 | 7/1967 | Katis et al. | 285/112 |
| 3,695,638 | 10/1972 | Blakeley | 285/112 |
| 3,756,629 | 9/1973 | Gibb | 285/373 X |
| 3,834,744 | 9/1974 | Masatchi | 285/373 |

FOREIGN PATENTS OR APPLICATIONS

| | | | |
|---|---|---|---|
| 659,878 | 2/1929 | France | 285/112 |
| 1,180,652 | 1/1959 | France | 285/112 |
| 92,324 | 8/1958 | Norway | 285/112 |

*Primary Examiner*—Thomas F. Callaghan
*Attorney, Agent, or Firm*—Thomas M. Scofield

[57] ABSTRACT

A pipe coupling includes arcuate shaped housing segments for positioning on the enlarged diameter ends of thin wall large diameter pipe as a complete coupling. The inside diameter of the coupling housing is larger than the corresponding pipe diameter such that the coupling does not contact the outside surface of the pipe. Each of the housing segments include a base portion and radial inward projections forming a gasket receiving groove. Each of the housing segments additionally include interlocking alignment means at connecting ends to radially and axially align the housing segments. The coupling also includes a gasket positioned within the gasket receiving groove and clamping means for drawing the housing segments together to couple and seal the connecting pipes with the gasket.

2 Claims, 5 Drawing Figures

PIPE COUPLING FOR LARGE DIAMETER PIPE

This is a continuation of application Ser. No. 452,877, filed Mar. 20, 1974 and now abandoned.

BACKGROUND OF THE INVENTION

The invention relates to a segmented coupling and more particularly is concerned with a coupling assembly used to couple large diameter thin wall pipe.

Segmented pipe connectors are generally used to couple pipes where it is desirable to permit easy assembly and disassembly thereof. In one prior segmented pipe coupling, the coupling is mechanically positioned on the pipe with a key engaging a groove in the pipe. In another prior segmented pipe coupling the coupling is mechanically positioned on the pipe with grip means engaging the outside surface of the pipe. These prior art couplings do not permit an axial expansion of the pipe within the coupling in the order of 0.75 inch as is required at least for some plastic pipe. In addition, the prior couplings are rugged and heavy castings which physically force the pipe to conform to the shape of the castings rather than permitting some accommodation in conforming to the shape of the pipe.

SUMMARY OF THE INVENTION

The pipe coupling includes arcuate shaped housing segments for positioning on the enlarged diameter ends of pipe as a complete coupling. The inside diameter of the coupling housing is larger than the corresponding pipe diameter such that the coupling does not contact the outside surface of the pipe. Each of the housing segments include a base portion and radial inward projections forming a gasket receiving groove. Each of the housing segments additionally include interlocking alignment means at connecting ends to radially and axially align the segments. The coupling also includes a gasket positioned within the gasket receiving groove and clamping means for drawing the housing segments together to couple and seal the connecting pipes with the gasket.

In the novel pipe coupling, the housing does not contact the pipe, but merely holds the gasket in place. The gasket seals the connecting pipes. The novel pipe coupling permits large axial expansion of the thin wall pipes and particularly thin wall plastic to be absorbed within the coupling without buckling of the pipe. In addition, by fabricating the housing as a light weld-fabrication, the housing substantially distorts and flexes to conform to out-of-round pipe.

DESCRIPTION OF THE PREFERRED EMBODIMENT

Figure 1:
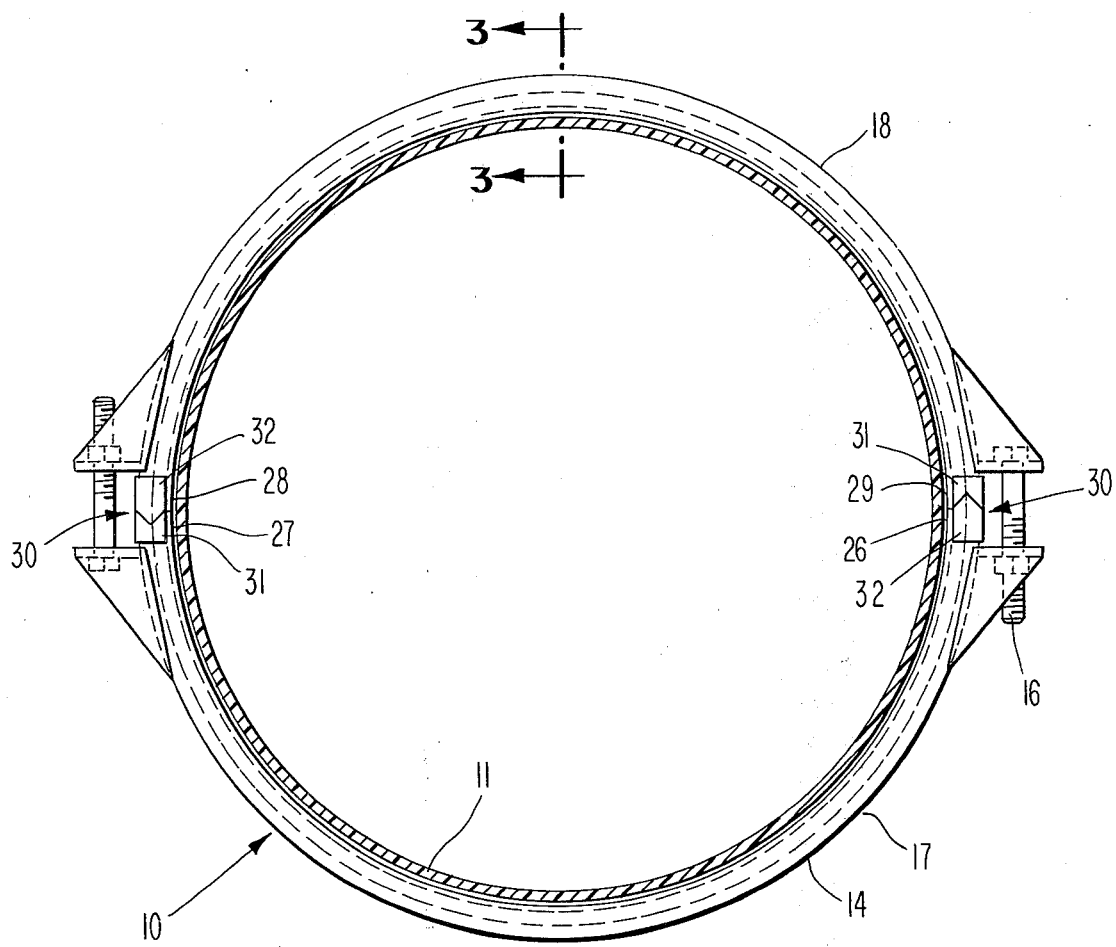
FIG. 1 illustrates the novel pipe connector positioned on pipe having enlarged diameter ends thereon.
Figure 2:
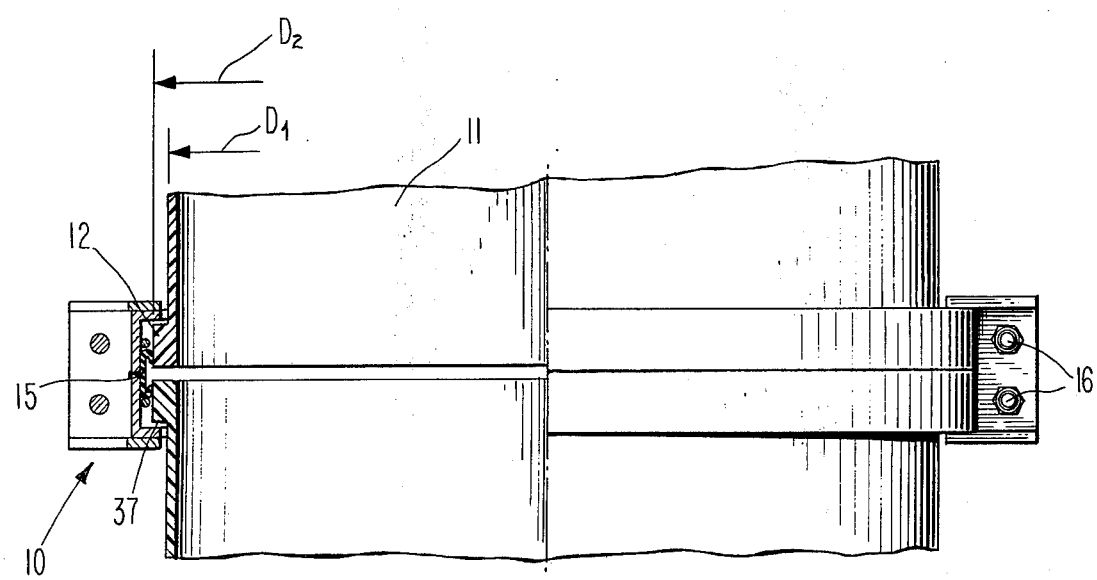
FIG. 2 is a top view partially in section of the novel connector illustrated in FIG. 1.

FIGS. 1 and 2 illustrate the novel pipe coupling 10 for coupling pipe 11 formed of fiberglass reinforced plastic or of aluminum or steel. The novel pipe coupling is specially desirable for use on thin wall pipe having a diameter greater than 24 inches although it may be used on smaller diameter pipe.

Figure 3:
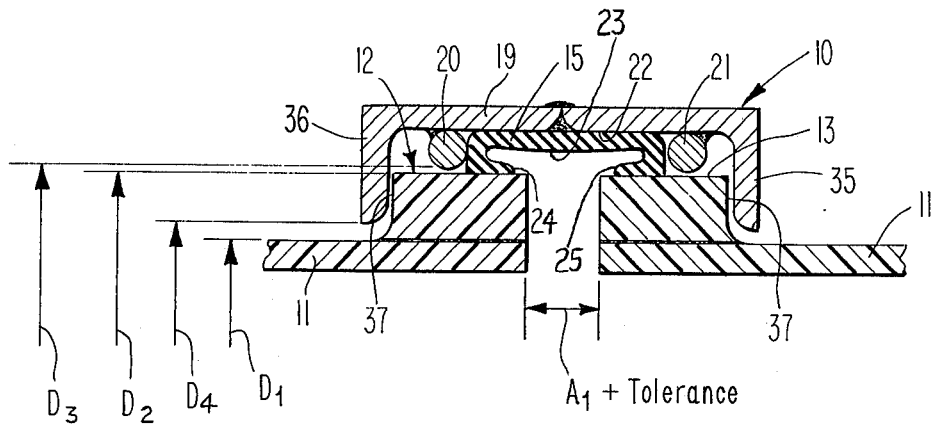
FIG. 3 is an enlarged sectional view on Section 3—3 of the pipe connector illustrated in FIG. 1.
Figure 4:
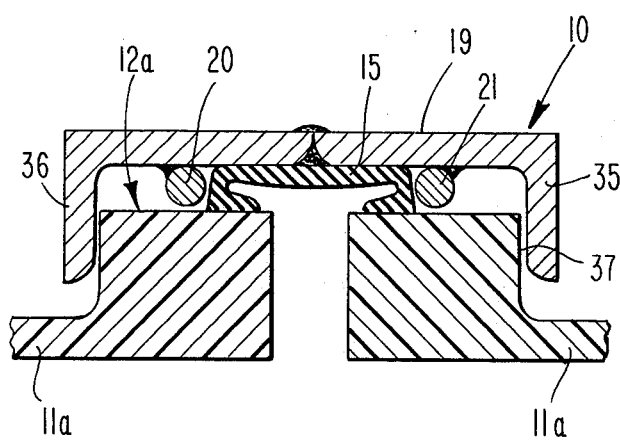
FIG. 4 is similar to FIG. 3 illustrating an alternate embodiment.

The novel coupling 10 is used on pipe having an enlarged diameter end 12 having a diameter D2 which is larger in diameter than the pipe diameter D1 as shown in FIGS. 3 and 4. The use of a sleeve is preferred for pipe having a diameter of 24 inches or larger since the outside pipe diameter D1 is frequently not round, the pipe diameter D1 is not constant from pipe to pipe, and the pipe may have an irregular outside surface which may not permit adequate sealing.

The enlarged pipe end 12 may be formed by adhesively attaching a sleeve 13 to the outside diameter D1 of the pipe 11 as shown in FIG. 3. This is preferable since the sleeve 13 can be accurately fabricated permitting uniformity, roundness, and smoothness in the enlarged end for assembly of the novel coupling 10. The pipe 11 also may be formed with an integral enlarged diameter end 12 as shown in FIGS. 2 and 4.

The novel coupling 10 includes a segmented housing 14, a gasket 15, and connecting bolts 16. In one embodiment used for connecting pipe up to 42 inches in diameter, shown in FIGS. 1 and 2, the segmented housing 14 is formed of a first arcuate shaped segment 17 and a second arcuate shaped segment 18.

Referring to FIGS. 3 and 4, the assembled housing 14 is formed with a base portion 19, and includes a first radial projection 20 and a second radial projection 21 extending inwardly from the base portion 19 to form a gasket retaining groove 22. The internal diameter D3 of the radial projections 20 and 21 is larger than the outside diameter D2 of the enlarged pipe end 12 when the coupling 10 is assembled on the pipe 11. The segmented housing 14 may be formed as a metal casting, but it is preferred that the housing 14 is weld-fabricated from standard stock metal shapes. In the preferred embodiment, the case portion 19 is roll formed of angle-iron stock and the inward projections 20 and 21 are formed of round stock which is attached to the base portion 14 as by welding.

A gasket 15 is positioned within the groove 22 formed by the radial projections 20 and 21 as better shown in FIGS. 3 and 4. The gasket 15 includes a base portion 23 which is positioned within the groove 22 and first and second sealing portions 24 and 25 respectively which engage the enlarged ends of the connecting pipes 11. When the gasket 15 is assembled in the radial groove 22, and the coupling 10 is assembled on the pipe 11, the coupling housing 14 does not contact the pipe but floats on the pipe. Only the gasket 15 contacts the pipe 11 and provides a seal between the pipe lengths. The first housing segment 17 includes a first end portion 26 and a second end portion 27 and the second housing segment 18 includes a third end portion 28 and a fourth end portion 29. The segments 17 and 18 connect at first and fourth end portions a6 and 29 and second and third end portions 27 and 28 respectively.

Each of the first and second housing segments 17 and 18 include alignment means 30 which engage the matching end of the adjacent connecting housing segment. The alignment means 30 provides both axial and radial alignment of the segments 17 and 18 with respect to each other to form a substantially circular coupling housing 15.

Figure 5:
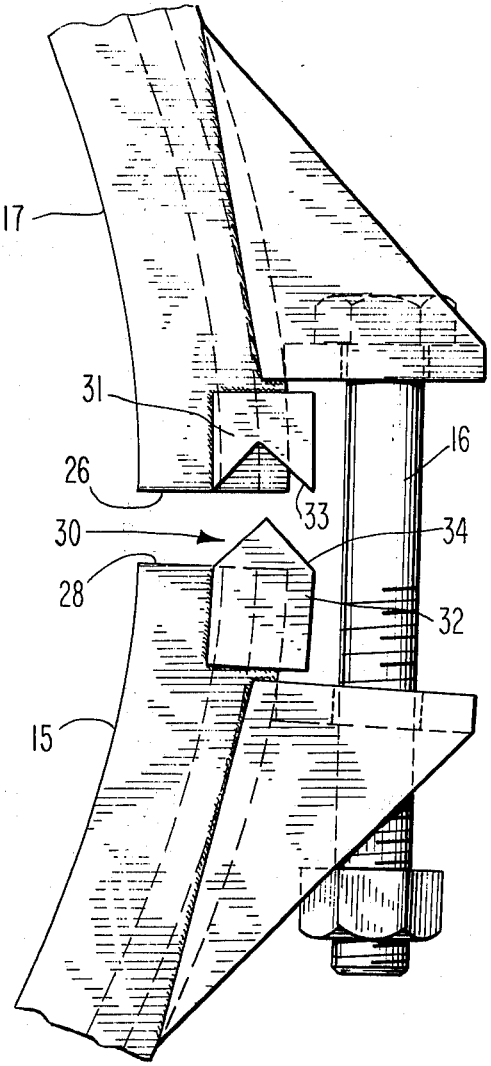
FIG. 5 is an enlarged fragmentary side elevational view of the novel pipe coupling of FIG. 1 illustrating the novel alignment means.

Referring to FIG. 5, the alignment means 30 includes a first pair of guide members 31 attached to the sides of one end of each housing segment 17 or 18 and a second pair of guide members 32 attached to the sides of the other end of each housing segment 17 or 18. At least one of the first and second pairs of guide members 31 or 32 extend beyond the end of the segments 14. This permits sliding one set of guide members over the sides of the connecting end of the other segment to axially align the segments.

The first pair of guide members 31 is also formed with a V-shaped cutout 33, and the second pair of guide members 32 is formed with a matching V-shaped projection 34 as shown in FIG. 5. When the matching segments 17 and 18 are assembled, the V-shaped projection 33 is guided within the V-shaped cutout 34 to align the housing segments radially.

The width of the base portion 19 of the housing 14 and the length of each of the enlarged diameter pipe ends 12 are sufficient to permit an axial expansion of the pipe of about 0.75 inch for 24 to 42 inch nominal diameter pipe. During axial expansion of the pipe 11, the gasket 15 slides on the enlarged diameter pipe ends 12.

In one embodiment, the base portion 19 includes a first and second inwardly facing radial flange 35 and 36 overlap the shoulder 37 formed by the enlarged diameter end 12 of the pipe 11. The inside diameter D4 of the flanges 35 and 36 is greater in diameter than the outside diameter D1 of the pipe such that the flanges 35 and 36 do not contact the outside diameter D1 of the pipe 11. The width of the base portion 19 between the flanges 35 and 36 is equal to the length of the enlarged diameter end portion 12 plus the expansion length (0.75 inch for 24 inch pipe) plus a length tolerance dimension. Therefore, the flanges 35 and 36 also do not generally touch the edges of the shoulders 37. The purpose of the flanges 35 and 36 is to prevent disengagement of the coupling 10 from the pipe 11.

The coupling 10 is assembled to the pipe 11 by first installing the gasket 15 connecting the pipe ends. The gasket must be substantially centered over the connecting pipe ends. Then the segments 17 and 18 are positioned over the gasket 15 and assembled by tightening the connecting bolts 16.

In a second embodiment (not shown) the only difference is that the segmented housing is formed of three or more segments. This embodiment is used for pipe sizes larger than 42 inches nominal diameter.

I claim:
1. A pipe joint comprising, in combination,
two lengths of thin wall, large diameter pipe arranged end to end for connection one to the other,
each of said pipe lengths having a continuous, circumferential, enlarged diameter end portion thereon at the juxtaposed ends for pipe end connection purposes,
said end portions of substantial rectangular cross section, whereby to provide therewith a peripheral flat circumferential bearing surface thereon and a substantially radially extending circumferential engaging shoulder,
and mechanical coupling means overlying and engaging said enlarged diameter pipe end portions comprising:
a plurality of arcuate segments adapted for assembled positioning, in a group, as a complete, pipe-end-encircling, rigid, circular coupling housing;
each of said segments having an arcuate, outboard, with respect to the pipe lengths being connected, rectangular base portion;
said assembled housing segments having an inside diameter, at the concave inner faces of said rectangular base portions, greater than the outside diameter of the enlarged pipe end portions;
said segments having a width somewhat greater than the combined width of the two pipe end enlarged portions to be connected;
said housing segments each having a pair of radial projections extending inwardly from the concave inner face of the base portion, spaced inwardly from the side edges thereof and laterally from one another, whereby to form a gasket receiving groove therebetween;
the said radial projections, in the assembled housing, having an inside diameter slightly greater than the outside diameter of the enlarged pipe end bearing surface portions and adapted to overlie same;
said housing segments each having a pair of radial flange portions of greater depth than the depth of said projections extending radially inwardly from the side edges of said base portion, whereby to enclose and overlap, when the housing is assembled around the pipe ends, the two juxtaposed, aligned, enlarged diameter pipe end portions;
said radial flange portions having, in the assembled housing on the pipe, an internal diameter less than the outer diameter of the pipe end enlarged portions, but somewhat greater than that of the pipe lengths, per se, and a lateral spacing therebetween somewhat greater than the combined width of the two pipe end enlarged portions;
a C-section gasket positioned inboard of the segment housing base portions, retained laterally by the inboard radial projections and having a sealing portion engaging the peripheral bearing surface portion of each of the enlarged pipe end portions,
clamping means positioned at each end of each arcuate segment adapted to cooperate with like clamping means on adjacent arcuate segments to form the circular housing; and
guide-interlock means positioned on each side of each arcuate segment and cooperating with like guide-interlock means on adjacent segment endings to rigidly retain and maintain the said segments coupled into the rigid circular housing, in cooperation with the said clamping means,
said guide-interlock means comprising first and second guide members, one of which is positioned along each side and outside of each housing segments at each connecting end thereof, each housing segment having two guide members at each end thereof,
said first guide members each having a V-shaped projection extending beyond the end of the housing segment carrying same, shaped cut-out positioned alongside but within the arc of said segment carrying same,
whereby, upon assembly of said segments into said circular housing, axial and radial alignment of said housing segments is achieved and maintained by the cooperation of the clamping and guide-interlock means.

2. A coupling as in claim 1 wherein each segment of said housing is made up of a pair of L-section angle-iron stock members welded together along one edge to form a C-section member and having inwardly extending projections formed of round stock attached to the concave base thereof.

* * * * *